US005927739A

United States Patent [19]

Evling

[11] Patent Number: 5,927,739

[45] Date of Patent: Jul. 27, 1999

[54] DUAL FRICTION WHEELCHAIR HAND RIM

[76] Inventor: Jens Evling, 42 Ralston Dr., Monterey, Calif. 93940

[21] Appl. No.: 08/726,509

[22] Filed: Oct. 7, 1996

[51] Int. Cl.[6] .......... B62M 1/14

[52] U.S. Cl. .......... 280/250.1; 74/557

[58] Field of Search .......... 280/250.1, 304.1, 280/242.1; 74/552, 557, 558; 301/95, 96, 97, 98; 152/379.3, 382

[56] References Cited

U.S. PATENT DOCUMENTS

| | | | |
|---|---|---|---|
| 1,872,052 | 8/1932 | Wrigley . | |
| 2,311,269 | 2/1943 | Van Cleave | 74/552 |
| 2,685,214 | 8/1954 | Maud | 74/552 |
| 2,828,645 | 4/1958 | Wilfert | 74/484 |
| 2,938,738 | 5/1960 | La Rue et al. | 280/249 |
| 3,282,605 | 11/1966 | Nihlean et al. | 280/211 |
| 3,331,260 | 7/1967 | Zeller et al. | 74/552 |
| 3,555,925 | 1/1971 | Bowser | 74/552 |
| 4,366,964 | 1/1983 | Farey et al. | 280/242 |
| 4,386,538 | 6/1983 | Van Wicklin, Jr. | 74/552 |
| 4,573,510 | 3/1986 | Ippen et al. | 301/97 |
| 4,593,929 | 6/1986 | Williams | 280/250.1 |
| 4,727,965 | 3/1988 | Zach et al. | 74/781 |
| 5,061,013 | 10/1991 | Hed et al. | 301/95 |
| 5,145,197 | 9/1992 | Gatti | 280/304.1 |

*Primary Examiner*—Lanna Mai
*Assistant Examiner*—Avraham H. Lerner
*Attorney, Agent, or Firm*—Welsh & Katz, Ltd.; Thomas W. Tolpin

[57] ABSTRACT

A convenient power grip hand rim assembly provides a user-friendly economical push rim to easily and safely control, maneuver, accelerate and brake a wheelchair. The dependable dual friction hand rim assembly can have a rubber-like traction ring providing a propulsion rim portion to propel the wheelchair and can have a smooth metal rim, brake or braking rim portion to restrain and brake the wheelchair without burning or otherwise injuring the user's hand. The power traction ring and braking rim can come in different cross-sectional configurations depending on the method of manufacture as well as to accommodate the preferences of the user and can have a special gripping surface to facilitate gripping. The braking rim portion can be made of titanium, aluminum, stainless steel or other medical grade metal and can be surface treated, tempered, hardened, coated, waxed, chrome plated, brass plated, painted or anodized to accommodate the desires and aesthetic appeal of the user.

14 Claims, 1 Drawing Sheet

DUAL FRICTION WHEELCHAIR HAND RIM

BACKGROUND OF THE INVENTION

This invention relates to wheelchairs and, more particularly, to hand rims for hand-propelled wheelchairs.

Many conventional hand-propelled wheelchairs are equipped with tubular steel hand rims with a circular cross-section. Each hand rim is usually mounted outboard of its respective wheel by connectors, such as spacers (standoffs), to provide a clearance between the hand rim and wheel. Some lightweight wheelchairs are equipped with integral hand rim and wheel rim assemblies. A combined hand rim and wheel rim for a wheelchair can also be formed from a single extruded section.

Wheelchair hand rims enable the wheelchair user to control the wheelchair's movement, such as acceleration, turning and braking. While generally suitable for their intended purpose of propelling and maneuvering the wheelchair, conventional wheelchair hand rims have numerous disadvantages. For example, the smooth metal surfaces of wheelchair hand rim tubing sections provide only limited gripping surfaces for the user. Furthermore, when the weather is humid, damp or rainy, or if the user's hands are perspiring, the wheelchair hand rims can become slippery. Often, when the user attempts to propel the chair in difficult situations, as when going up ramps, traveling on wet pavement, moving on soft carpets, traversing dirt or gravel areas, grass or other rough terrain, the user often experiences difficulty and must resort to such tactics as placing their hands over both tires and hand rims to exert sufficient torque. Moreover many users push forward with the help of the tire to increase friction. Dirt and debris on the tires, and glass, stones or metal objects stuck in the tire can dirty and even injure the user's hands. The standard hand rims also limits the ability of the user to properly and safely control the brake the wheelchair while descending a ramp. Also, a considerable amount of the user's effort is expended in gripping the slippery metal hand rims rather than in applying torque to propel the wheelchair.

In the marketplace today there are coated hand rims for wheelchairs and non-coated hand rims for wheelchairs. Coated hand rims can be used by people with reduced hand strength or function. Coated hand rims offer somewhat higher friction. There are different types of coatings available in the market place including hard coatings, such as hard vinyl and hard urethane, and soft coatings, such as soft vinyl and molded isobutyl foam rubber. However, the disadvantages of coated hand rims are that when braking the high friction coated hand rims cause the hands to get very hot which can bum or otherwise injure the user's hands. Furthermore, most conventional coated hand rims are not very durable, and often become unusable in less then six months. Hard coatings can be easily chipped away with use, creating sharp edges which can cut the user's hand. Soft coatings, such as soft vinyl and isobutyl foam, do not have sharp edges, but have a much shorter life. The non-coated hand rims are used primarily by people with full strength and function in their hands. For most users with full hand strength and function, the disadvantages outweigh the benefits and most buy non-coated hand rims. All users could however, benefit from additional traction when accelerating.

In recent years wheelchair sports have become increasingly popular, and have prompted changes directed toward making wheelchairs more easily and efficiently maneuverable. Sport wheelchairs are often equipped with hand rims formed from a slightly larger diameter tubing which improves the grip to some extent. The grip may be further improved by providing a soft vinyl coating on the hand rim, but this has the disadvantage of considerably diminishing the durability of the hand rim.

A different set of problems may be presented for paraplegics, quadrapalegics, users with multiple sclerosis and others having limited grip strength. Some conventional hand rims for such users utilizes a circular ring similar to regular hand rims, but having plurality of radially or axially projecting handles or push rods which the user may push with their palm without having to grip. These so-called projection hand rims are useful when required, but are heavy and relatively expensive. Moreover, they are extremely awkward and unsuitable for general use. The main problem with projection hand rims with push rods is difficulty in braking. Also, the push rods can become caught up on draperies, furniture, and the like. Some wheelchairs utilize a system in which push rods are partially retracted towards the bottom of their travel, thereby at least partially obviating this problem. However, this result is achieved at the expense of complexity.

It is, therefore, desirable to provide an improved wheelchair hand rim which overcomes most, if not all, of the preceding problems.

SUMMARY OF THE INVENTION

An improved wheelchair hand rim assembly is provided to better enable the wheelchair user to control the wheelchair's movements, such as cruising, turning, maneuvering, propelling, accelerating, decelerating, braking and stopping. The reliable light-weight hand rim assembly can be readily and easily grasped to power, control and propel the wheelchair to the desired speed by the user without having to grasp the tires and wheels of the wheelchair and dirty the user's hands. Desirably, the user-friendly durable hand rim assembly can safely brake a wheelchair without burning or injuring the user's hands or otherwise harming the user. The beneficial economical hand rim assembly can be comfortably used by paraplegics, quadrapalegics, patients recovering from surgery, elderly patients, and others who are having difficulty walking.

The novel power grip hand rim assembly, also referred to as a power grip hand rim, provides a dual friction or multi-friction hand rim or push rim. In order to better control braking, speed and movement of the wheelchair, the hand rim assembly has a braking rim portion to manually brake deceleration and stop the wheelchair and has a propulsion push rim portion to manually propel, accelerate and advance the wheelchair in a forward or rearward direction, as desired. The braking and propulsion rim portions are molded, fabricated or otherwise constructed of different materials and cooperate with each other to provide a dual friction composite rim assembly.

In the preferred form, the braking rim portion comprises a rim, annular braking member, or brake with a manually grippable braking surface that is positioned laterally outwardly and outboard of the propulsion rim portion. The braking rim portion can be molded or extruded of low friction medical grade material, such as: impact-resistant plastic, carbon-reinforced plastic, fiber-reinforced plastic, or metal, such as rolled steel, stainless steel, aluminum or preferably titanium. For even lower friction, the griping surfaces of the braking rim portion can be smooth, glossy, waxed, or polished. To accommodate the desires and aesthetic appeal of the user, the braking rim portion can be tempered, hardened or surface treated and can be chrome plated, brass plated, painted or anodized. The braking rim portion can have retention fingers and/or a recessed area defining a groove to snugly receive and retain the propulsion rim portion.

In the preferred form, the propulsion rim portion comprises a power grip traction ring, drive rim, or annular upright propulsion member. The propulsion rim portion can have a manually grippable, circumferential, propulsion surface and can have slits, knurling, protuberances, texturing or channels to enhance gripping. Advantageously, the propulsion rim portion of the dual friction rim assembly comprises a material having a higher coefficient of friction than the braking rim portion. The propulsion rim portion can be molded, extruded, fabricated or otherwise made of elastomeric material, such as natural rubber, neoprene rubber, or rubber-like plastic, silicon-rubber, polyurethane and blends or combinations of the preceding. In the illustrated embodiment, the propulsion rim has an outer grippable section providing a power grip and has a wider inner engageable section which is disposed radially inwardly of the outer grippable section to firmly hold and wedge the propulsion rim portion in the braking rim.

The new type of wheelchair hand rim or push rim combines two or more features that have not previous been available in conventional hand rims. The construction and arrangement of the novel hand rims provide high friction when accelerating and low friction when braking. Advantageously, the inventive wheelchair hand rim enables the user to propel the chair with the expenditure of significantly less energy, thereby greatly increasing mobility. The user is able to apply increased torque with less grip effort on all points of the power stroke in both the forward and backward directions, and is left with more reserve for difficult situations.

The sloping gently curved braking portion blends smoothly with the upper curved portion of the traction rims to provide an effective palm grip surface. The outboard metal surface of the dual friction hand rim provides a smooth braking surface on which the user's thumb rests while leaving an elastomeric crown over the top of the traction ring for providing more traction area.

Furthermore, the improved hand rim can be suitable for users having extremely limited grip strength. This hand rim avoids the need for radially or axially projection push rods that have difficulty in braking and tend to get caught up on furniture and other objects in the environment. At the same time, the hand rim is of a simple and lightweight construction.

Power grip hand rims can be produced in a variety of types and sizes to fit most wheelchair brands and models. The power grip hand rims can also be made available with an easy-to-install mounting kit, complete with mounting instructions for various types of rims such as tab or bolt mount.

The power grip hand rims of this invention provide a superb grip to manual wheelchair users with varying degree of abilities. Primarily for everyday use, the power grip hand rims can also be used on quadriplegic's rugby chair and for a variety of sports chairs. Their tacky, rubberized surfaces enable quadriplegics and others to propel themselves forward with more control and less effort than with a standard aluminum or coated hand rim. For quadriplegics, paraplegics, and others, the power grip hand rims prevent cuts on hands caused by sharp edges of plastic coating that has chipped away as in conventional coated hand rims. The power grip hand rims also retain their grip in all weather conditions, and are resistant to extreme heat or cold. Desirably, the power grip hand rims are extremely durable, so replacing conventional hand rims every six months will become a thing of the past. The power grip hand rim offer a superior value to the wheelchair user because it outlasts most coated hand rim alternatives, while adding comfort and control to their everyday lives.

A more detailed explanation of the invention is provided in the following description and appended claims taken in conjunction with the accompanying drawings.

DETAILED DESCRIPTION OF THE PREFERRED EMBODIMENTS

Figure 1:
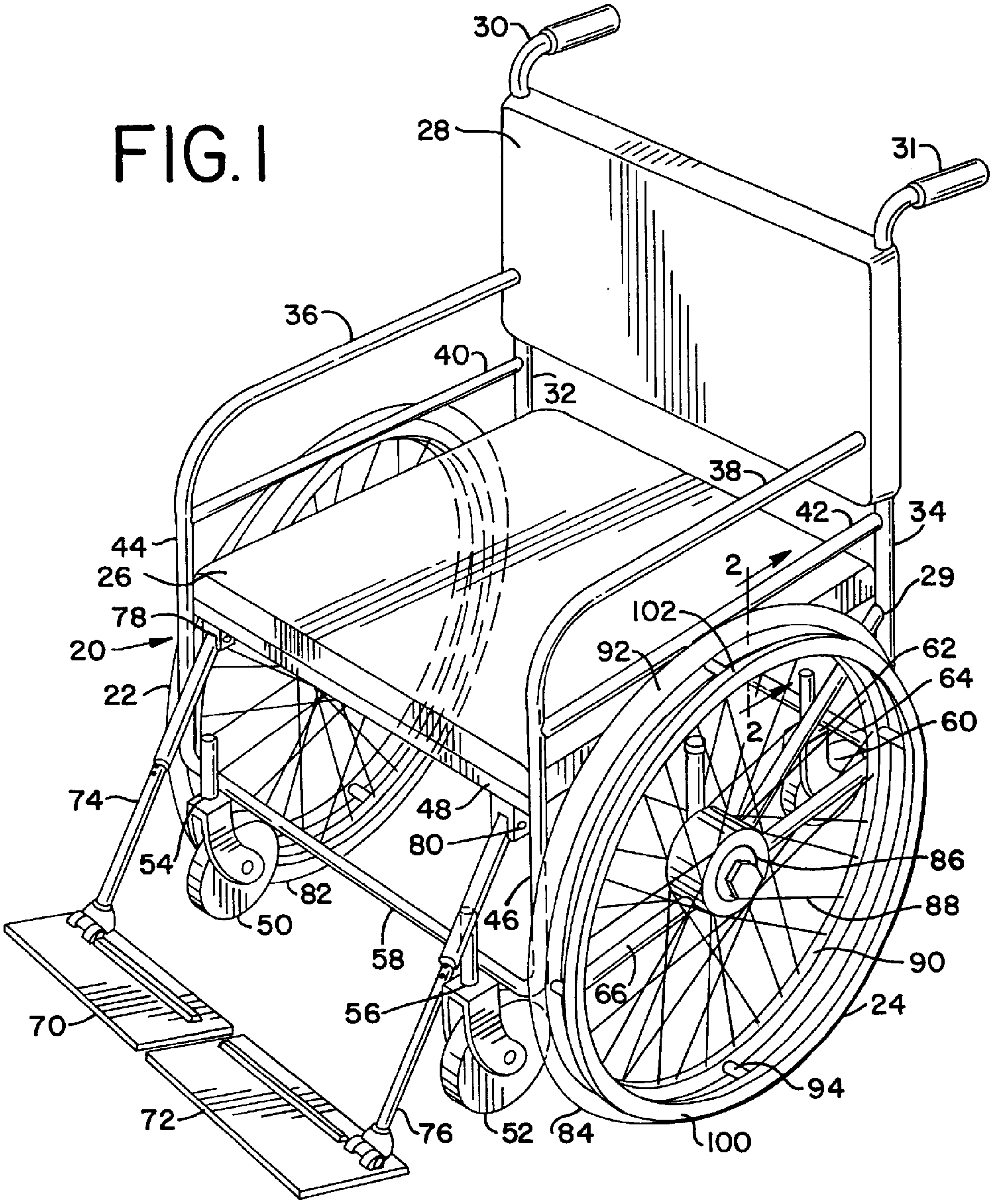
FIG. 1 is a perspective view of a wheelchair equipped with hand rims in accordance with principles of the present invention.

FIG. 1 illustrates a hand propelled (manually propelled) wheelchair 20 equipped with a pair of dual friction composite power grip hand rim assemblies 22 and 24, also referred to as power grip hand rims. The wheelchair can have a horizontal seat 26, an upright back 28 and a chair frame 29 with rearwardly extending handle bars 30 above, along or from the back. The handles can include rubber or plastic elastomeric finger grippable covers providing push handles 31. The seat and back can comprise cushions and be padded. The seat can be constructed of woven fabric, leather, plastic webbing, cane, bamboo or other material. The chair frame can have upright rearward (back) posts 32 and 34 to support the back and the push handles. Webbing can extend between the back posts to further support the back. The back and upper portion of the rearward posts can be removed for quadrapalegics who prefer to lie and control the wheelchair on their stomach.

The chair frame can be made of metal tubing and can have horizontal arm rests 36 and 38 and side rails 40 and 42 along the sides of the seat. The chair frame also has front posts 44 and 46 and a seat frame 48. The front posts extend downwardly from the arm rests to a position below the seat and above the front wheels, casters or rollers 50 and 52. The front wheels can be connected by front sockets or swivel joints 54 and 56 and clamps or other connectors to the front posts or to a front bar 58 which extends horizontally between and connects the front posts. The wheelchair can have back wheels, casters or rollers 60. The back wheels can be connected by back sockets or swivel joints 62 and clamps or other connectors to the back posts or to a back bar 64 which can extend horizontally between and connect the back posts.

The arm rests, side rails and seat frame extend horizontally between and connect the front and back posts. The seat frame has a rectangular shape with a front, sides and a back portion. Webbing can extend between the sides or front and back portion of the seat frame to further support the seat. Sides bars 66 can extend laterally between and connect the front and back bars. The wheelchair can also have foot rests or foot plates 70 and 72 which can be connected by diagonal articulated leg supports or braces 74 and 76 to the seat frame, front post or front bar via leg sockets or swivel joints 78 and 80.

The wheelchair has a pair of large diameter drive wheels 82 and 84 positioned along the sides of the wheelchair. The drive wheels are much larger than the front and back stabilizing wheels or casters. The drive wheels can extend from the floor or pavement to a position in proximity to or slightly above the seat. Each drive wheel can have: a hub 86, spokes 88 extending radially between and connecting the hub to an outer drive wheel-rim 90, and a tire 92 mounted on the drive wheel-rim. The tire can be pneumatic or non-pneumatic. The hubs of the drive wheels can be connected to an axle, shafts or chair frame via bearings. The hub can enclose gears or contain suitable gearing for first gear, second gear, third gear, etc.

The hand rim assemblies 22 and 24 provide power grip hand rims or push rims which are positioned laterally outwardly and outboard of the drive wheels. The hand rim assemblies can be connected to the outer drive wheel-rim by suitable connecting devices 94, such as: bolts, bushings, bars, clamps, couplers, welding, pins, extenders, spacers, standoffs, or other fasteners. The hand rim assemblies are designed and constructed to be comfortably gripped by the person in the wheelchair, i.e., the wheelchair user. One hand rim assembly, such as the left hand rim assembly drives and can be connected to the left drive wheel. Another hand rim assembly, such as the right hand rim assembly drives and can be connected to the right drive wheel. For persons with the use of only one hand, one or both hand rim assemblies can be positioned on the side of the wheelchair in proximity to the person's useful hand, but are capable of driving both drivewheels. The maximum diameter of the hand rim assemblies are slightly smaller than the maximum diameter of tires of the drive wheels so that the hand rims do not touch the pavement or floor and pickup dirt, pebbles, sharp objects or other debris which could dirty and harm the user's hands. The wheelchair hand rim assemblies, therefore, remain clean and protect and keep the user hands.

The user-friendly hand rim assemblies are grasped, pushed and controlled by the wheelchair user to cruise, turn, maneuver, propel, accelerate, decelerate, brake and stop the wheelchair. Each hand rim assembly can have a power grip traction ring 100 and a tubular metal braking rim 102. The traction ring comprises an elastomeric annular propulsion rim or rubber-like circular rim portion to manually propel the wheelchair, either forwardly or backwardly, as desired. The braking rim comprises a smoother metal rim, circular brake or annular braking portion to manually brake, restrain and stop the wheelchair. The metal braking rim of the dual friction hand rim has a lower coefficient of friction than the traction ring. The traction ring and braking rim cooperate with each other to form a multi-friction composite power hand rim to better control, accelerate, maneuver and brake the wheelchair.

The traction ring 100 can comprise a solid elastomeric propulsion rim made of rubber, rubber-like plastic, neoprene, silicon, or polyurethane, or combinations or blends thereof. The traction ring can have an outer grippable circumferential section 104 (FIG. 2) and an inner interior section 106. The grippable section of the traction ring can have a resilient, grippable, outer curved surface 108, which can extend from 15° to 90° to cushion the user's hands. The curved surface can be arcuate and can comprise a convex textured surface or crown to facilitate gripping. The textured surface can have peaks and valleys providing channels 110 to further enhance gripping and to define passageways for flow of water when the wheelchair is being propelled and moved in the rain or when driving over wet surfaces. If desired, the textured surface can have bumps, protuberances, knurling or finger-grips to enhance gripping.

The inner section 106 of the traction ring is disposed radially inwardly of and is integrally connected to the grippable outer section of the traction ring. The inner section is preferably wider and thicker than the outer section of the traction ring for enhanced structural strength. To this end, the inner section's side walls 112 and 114 and bottom 116, are wider and have a greater span than the outer section's side walls 118 and 120 and top comprising the outer surface 108.

The braking rim 102 can be made of impact-resistant medical grade metal, such as stainless steel or polished metal and is preferably made of extruded polished or smooth, light weight aluminum or anodized aluminum, and most preferably titanium, for best results. The braking rim can have a hollow interior compartment 122 to decrease the weight of the braking rim and wheelchair for faster speed and ease of transport. The braking rim can have a generally U-shaped cross-section 124 and a channel section 125. The U-shaped cross-section can extend from 270° to 345°. The curved outer end portions or tips 126 and 127 of the braking rim's U-shaped cross-section provides a circular edge. The minimum spacing between the outer end portions or tips is preferably less than the maximum span and distance of the braking rim's channel and bridging portion to further securely grasp, wedge and connect the traction ring.

The braking rim's channel section extends between and is integrally connected to the U-shaped cross-section. The channel section defines a channel 128 which has a shape and configuration that is generally complementary to and a mirror image of the traction ring's inner (interior) section to snugly receive and firmly hold the traction ring. The channel section's sides 130 and 132 are positioned and wedged against and abuttingly engage the side walls of the traction ring's inner section. The channel section has a bridging portion 134 providing a bight which extends between and connects the channel section's sides to securely support and abuttingly engage the bottom of the traction ring. The U-shaped cross-section and the channel section are integrally connected and cooperate with each other to substantially enclose and surround the hollow interior compartment of the braking rim.

In order to safely and efficiently facilitate braking, the braking rim has a grippable braking surface 136 which is positioned laterally outwardly and outboard of the traction ring. The braking surface can be convex, curved, and rounded and is shaped with a sufficient radius to comfortably receive the palm and fingers of the user's hands. Preferably, the outer braking surface is generally smooth to prevent burning and injury to user's hands during braking and gripping, while the wheelchair is in motion. The opposite inner (inboard) surface 138 of the braking rim can be symmetrical to the braking surface. In the illustrative embodiments, the braking surface and inner surface are flush with the crown and outer grippable surface of the traction ring.

Figure 2:
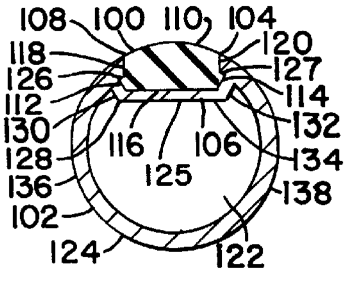
FIG. 2 is a cross-sectional view of a hand rim taken substantially along line 2—2 of FIG. 1 in accordance with principles of the present invention.

In the embodiment of FIG. 2, the side walls 140 and 142 of the traction ring and the sides 144 and 146 of the braking rim's U-shaped cross-section are slanted or beveled outwardly at an angle of inclination ranging from 10° to 60° from the vertical, and provide inclined side portions which diverge radially outwardly.

Figure 3:
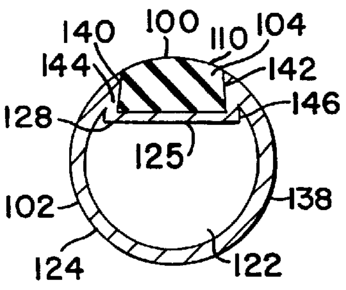
FIG. 3 is cross-sectional view of another hand rim taken substantially along line 2—2 of FIG. 1 in accordance with principles of the present invention.

In the embodiment of FIG. 3, the side walls of the traction ring and the sides of the braking rim's U-shaped cross-section are flared or inclined inwardly at an angle of inclination of 10° to 75° from the vertical, and provide inclined side portions which diverge toward the hollow interior compartment of the braking rim. The traction ring's inner section and the braking rim's channel section can also have interlocking fingers or teeth to further secure and firmly connect the traction ring to the braking rim.

Figure 4:
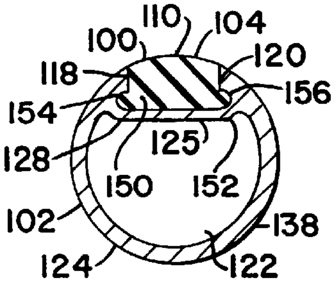
FIG. 4 is a cross-sectional view of still another hand rim taken substantially along line 2—2 of FIG. 1 in accordance with principles of the present invention.

In the embodiment of FIG. 4, the traction ring's inner (interior) section and the braking rim's channel section have an inverted mushroom-shaped head or bulb-shaped foot which provides enlarged base portions 150 and 152. The base portions also provide interlocking complementary fingers 154 and 156 to further connect and firmly secure the traction ring and braking rim.

From the above description, it can be appreciated that the hand rim comprises two main parts: a braking rim and a traction ring. When the hand rim is viewed from the side as if looking towards the wheelchair with the wheel behind the hand rim, the side surface of the braking rim is clearly visible and the traction ring is barely visible. When the hand rim is viewed from the top as the user would see it when sitting in the wheelchair, the friction surface of the traction ring is clearly visible.

The braking rim is circle shaped with a cross section that allow the traction ring to stay in the hand rim. The traction ring and braking rim can have different cross-sectional configurations, such as shown in FIGS. 2, 3 and 4. The cross-sectional configuration can be made to the preferences of the user and is somewhat dependent of what type of equipment is used to manufacture the rim and the traction ring.

The braking rim can be made of extruded aluminum, molded plastic, rolled steel or other material. The traction ring is a separate ring made of rubber or another pliable material that has a high coefficient of friction. The traction ring has a cross section that allows it to be readily gripped. The traction ring and braking rim are secured together to form a dual friction wheel chair hand rim.

The inner core comprising the braking rim of the hand rim can be made of aircraft aluminum (6061-T6) which makes it extremely strong yet lightweight. The traction ring can be made of durable rubberized elastomer, giving the user unmatched power not available through foam or plastic-coated alternatives.

The traction ring can be transfer or injection molded to the desired shape. The shape is such that traction ring can stay in the braking rim without adhesive. The traction ring can have a textured surface to enhance the gripping in wet weather. Three or more sizes of traction ring are available to fit different variations and preferences of hand rim users.

The braking rim can be rolled in a conventional way, to the desired diameters and mounting tabs can be welded on for applications that require them, if the rim is made of extruded aluminum tubing. The hand rim can be anodized in a desired color. A motor driven drum with a guiding roller can be used to fabricate braking rims. Other methods such as a standard three roller, rolling machine or a cam bender can be used. If the braking rim is made of formed steel tubing it could be rolled made with similar equipment. If the braking rim is made of synthetic material, it can be molded to the desired shape.

After the braking rim is formed, the traction ring is applied to assemble the hand rim. The traction ring could be applied with two rollers that squeeze it on, or the traction ring could be mounted with other methods such as a vacuum machine that automatically presses the rubber on. The traction ring could also be applied by hand.

The dual friction hand rims enable the user to push forward on top of the rims using the high friction coefficient of the traction rings to get good traction. This will greatly assist the users that have reduced hand function and/or strength. When going down hill, the user can put the hands against the side of the braking rim, where the friction is less and therefore steer and brake smoother. Should an emergency come up, the user can use the top surface to stop quickly. The features of the dual friction hand rim make this hand rim safer and better to use then any other hand rim.

The overall height of the traction ring provides a relatively large amount of hand rim surface for frictional engagement with the user's hand. The contour of the hand rim allows the user to comfortably and securely grip the hand rim. The curvature of braking rim further enhances the palm grip. It is desirable to maintain a minimum hand rim width in order to minimize the overall wheelchair width and facilitate access of the user and wheelchair into tight places. At the same time, it is desirable for control and comfort purposes to have a relatively gentle curvature. The curvature of the hand rim affords a firm grip and smooth control when the user is descending ramps as well as when travel on a flat surface or bumpy terrain. The traction ring provides good traction for acceleration and propulsion.

It can be appreciated that the present invention provides a very useful wheelchair hand rims that permits the user to make the most effective use of their effort. The hand rims are configured so that the hands and palms tend to naturally fit and close around the wheelchair hand rims when pushing and pulling thereon. The curved dual friction contour allows the user to more effectively utilize and apply force to the wheelchair hand rims.

It can further be appreciated that while the power grip hand rims are shown for use with the illustrated wheelchair, the power grip hand rims can be used with most other types of wheelchairs, including sports wheelchairs.

Among the many advantages of the improved wheelchair hand rims of the invention are:

1. Superb performance.
2. Excellent wheelchair maneuverability, handling and braking.
3. Better protection for the user's hands.
4. Easy to use.
5. User-friendly.
6. Good wear.
7. Convenient.
8. Safe.
9. Inexpensive.
10. Attractive.
11. Dependable.
12. Durable.
13. Comfortable.
14. Effective.

Although embodiments of the invention have been shown and described, it is to be understood that various modifications and substitutions, as well as rearrangements of parts, components, and assembly steps, can be made by those skilled in the art without departing from the novel spirit and scope of this invention.

What is claimed is:

1. A hand rim assembly for a wheelchair, comprising:

a traction ring comprising an elastomeric annular propulsion rim for manually propelling a wheelchair, said propulsion rim having a grippable circumferential propulsion section and an inner interior section disposed radially inwardly of said grippable circumferential propulsion section, and said interior section having side walls and a bottom;

a tubular metal braking rim for manually braking said wheelchair, said metal braking rim having a lower coefficient of friction than said traction ring, said tubular braking rim having a hollow interior compartment to decrease the weight of said braking rim and wheelchair, said braking rim having a generally U-shaped cross-section and a channel section connected to said U-shaped cross-section, said channel section defining a channel having a shape complementary to said interior section of said propulsion rim for snugly receiving said propulsion rim, said channel section having sides for abidingly engaging said side walls of said interior section of said propulsion rim and having a bridging portion providing a bight extending between and connecting said sides for engaging and supporting said bottom of said interior section of said propulsion rim, said U-shaped cross-section having a grippable convex braking surface positioned laterally outwardly of said propulsion rim for receiving the palm and fingers of the user's hand, and said U-shaped cross-section and said channel section cooperating with each other to substantially enclose and surround said hollow interior compartment; and said traction ring and said braking rim cooperating with each other to form a multi-friction composite power hand rim for better controlling, acceleration, maneuvering and braking of the wheelchair.

2. A hand rim assembly in accordance with claim 1 wherein said propulsion rim comprises a substantially solid propulsion rim of an elastomeric material selected from the group of material rubber, rubber-like plastic, neoprene, silicon, and polyurethane.

3. A hand rim assembly in accordance with claim 1 wherein said propulsion rim has a resilient grippable curved surface to cushion the user's hands and said inner section is wider than said resilient grippable surface.

4. A hand rim assembly in accordance with claim 1 wherein said propulsion rim has a textured convex grippable propulsion surface to facilitate gripping and said textured surface has channels defining passageway for passage and flow of water when said wheelchair is being propelled in the rain and driving over wet surfaces.

5. A hand rim assembly in accordance with claim 1 wherein said side walls of said propulsion rim and said sides of said U-shaped cross-section of said braking rim are slanted to provide inclined side portions which diverge radially outwardly.

6. A hand rim assembly in accordance with claim 1 wherein said side walls of said propulsion rim and said sides of said U-shaped cross-section of said braking rim are flared to provide inclined side portions which diverge towards the hollow interior compartment.

7. A hand rim assembly in accordance with claim 1 wherein said interior section of said propulsion rim and said channel section of said braking rim have an inverted mushroom-shaped head providing base portions which are wider than said grippable propulsion section.

8. A hand rim assembly in accordance with claim 1 wherein said interior section of said propulsion rim and said channel section of said braking rim have tips for securing said propulsion rim to said braking rim.

9. A hand rim assembly in accordance with claim 1 wherein said grippable braking surface is generally smooth to substantially prevent burning and injury to the hand of the user in the wheelchair and said grippable propulsion section has an arcuate grippable propulsion surface extending from about 15 degrees to about 90 degrees providing a crown disposed substantially flush with said grippable braking surface of said braking rim.

10. A hand rim assembly in accordance with claim 1 wherein said tubular braking rim comprises a metal selected from the group consisting of aluminum, anodized aluminum, polished metal, and titanium and said U-shaped cross-section extends about 270 degrees to about 345 degrees.

11. A hand rim assembly in accordance with claim 1 wherein said grippable propulsion section has flaps defining slits to enhance gripping.

12. A hand rim assembly in accordance with claim 1 wherein:

said U-shaped cross-section of said braking rim has curved outer end portions; and said outer end portions being spaced from each other a distance less than the maximum span of said channel and said bridging portion to securely grasp and wedge said traction ring.

13. A wheelchair, comprising:

a seat;

a back extending upwardly and positioned rearwardly of said seat of the wheelchair;

a frame for supporting said back and said seat of the wheelchair;

wheels operatively connected to said frame, said wheels having tires for engaging the ground;

a pair of multi-friction composite hand rims operatively connected to and spaced laterally outwardly of said wheels, each of said multi-friction composite hand rims having a maximum diameter smaller than said tires, said multi-friction composite hand rims being spaced entirely above the ground, each of said multi-friction hand rims comprising a traction ring comprising a annular propulsion rim portion for manually propelling the wheelchair, said propulsion rim portion comprising a grippable circumferential propulsion section; and a braking rim portion connected to said traction ring, said braking rim portion having a lower coefficient of friction than said traction ring.

14. A wheelchair in accordance with claim 13 wherein:

said traction ring has a greater span than said braking rim portion;

said traction ring comprises elastomeric material; and said braking portion comprises metal.

* * * * *